United States Patent
Molnar et al.

(10) Patent No.: US 8,901,204 B1
(45) Date of Patent: Dec. 2, 2014

(54) CROSS-LINKED ETHYLENE PROPYLENE DIENE TERPOLYMER LATEX BLEND FOR IMPROVED COATINGS

(71) Applicant: Lion Copolymer Geismar, LLC, Geismar, LA (US)

(72) Inventors: Michael J. Molnar, Baton Rouge, LA (US); George A. Von Bodungen, Baton Rouge, LA (US); Subir Debnath, Baton Rouge, LA (US); Harold William Young, Jr., Baton Rouge, LA (US); Zhiyong Zhu, Baton Rouge, LA (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 0 days.

(21) Appl. No.: 14/254,219

(22) Filed: Apr. 16, 2014

Related U.S. Application Data

(60) Provisional application No. 61/829,961, filed on May 31, 2013, provisional application No. 61/829,971, filed on May 31, 2013, provisional application No. 61/829,975, filed on May 31, 2013.

(51) Int. Cl.
*C08L 33/08* (2006.01)
*C08L 23/08* (2006.01)
*C08L 75/04* (2006.01)
*C08L 63/00* (2006.01)
*C08L 67/00* (2006.01)

(52) U.S. Cl.
CPC ............ *C08L 23/0823* (2013.01); *C08L 33/08* (2013.01); *C08L 75/04* (2013.01); *C08L 63/00* (2013.01); *C08L 67/00* (2013.01)
USPC ............ 523/122; 524/47; 524/156; 524/157; 524/158; 524/236; 524/451; 524/501; 524/502; 524/507; 524/523; 524/525

(58) Field of Classification Search
CPC ..... C08L 23/0823; C08L 33/08; C08L 75/04; C08L 63/00; C08L 67/00
USPC ............ 523/122; 524/47, 156, 157, 158, 236, 524/451, 501, 502, 507, 523, 525
See application file for complete search history.

(56) References Cited

U.S. PATENT DOCUMENTS

| | | |
|---|---|---|
| 3,894,978 A | 7/1975 | Montesissa et al. |
| 3,979,346 A | 9/1976 | Zuckert et al. |
| 4,299,742 A | 11/1981 | Belder et al. |
| 4,301,048 A | 11/1981 | Hirayama et al. |
| 4,497,933 A | 2/1985 | Gorzinski et al. |
| 5,985,953 A | 11/1999 | Lightsey et al. |
| 8,357,733 B2 | 1/2013 | Wallen et al. |
| 2012/0145721 A1* | 6/2012 | Cavallin et al. ............... 220/626 |

* cited by examiner

*Primary Examiner* — Edward Cain
(74) *Attorney, Agent, or Firm* — Buskop Law Group, PC; Wendy Buskop

(57) ABSTRACT

Latex blend formulations that include a high solids cross-linked ethylene propylene diene terpolymer latex with acrylics, polyurethane, epoxy, or alkyd resin usable as a waterproofing material for roofs or usable in paints and adhesives.

25 Claims, 4 Drawing Sheets

| Examples Group 1 Acrylic / EPDM | | | a | b | c | d | e | f | g | h | i |
|---|---|---|---|---|---|---|---|---|---|---|---|
| Materials | Function | Source | Pound | Pound | Pound | Pound | Pound | Pound | Pound | Pound | Pound |
| EPDM High Solid Latex | EPDM Latex | Lion Copolymer, LLC | 3 | 27 | 15 | 5 | 45 | 20 | 10 | 80 | 35 |
| Acronal Optive® 320 | Straight Acrylic Emulsion | BASF | 27 | 3 | 15 | 45 | 5 | 30 | 80 | 10 | 55 |
| DI Water | | | 12.7 | 11.8 | 12.2 | 18.7 | 18.8 | 18.7 | 3.9 | 4 | 3.9 |
| Tiona® 595 | TiO2 pigment | Cristal global | 15 | 15 | 15 | 10 | 10 | 10 | 5 | 5 | 5 |
| Zinc oxide CR-41 | Pigment and brigness enhancer | G. H. Chemicals | 5 | 5 | 5 | 3 | 3 | 3 | | | |
| Albacar® 8101 | Calcium carbonate extender | Specialty Minerals | 30 | 30 | 30 | 15 | 15 | 15 | | | |
| Nuosperse® FX 603 | Pigment dispersant | Elementis | 4 | 6 | 5 | 2 | 2 | 2 | 1 | 1 | 1 |
| Nuvis® FX 1035 | Thickener | Elementis | 1 | 1 | 1 | | | | | | |
| BYK®-021 | Defoamer | BYK | 0.5 | 0.5 | 0.5 | 1 | 1 | 1 | | | |
| DBE-3 | Coaelecent agent | Dupont | 1.5 | 0.5 | 1 | | | | | | |
| Bioban™ BP-40 | Biocide | Dow Chemicals | 0.2 | 0.2 | 0.2 | 0.2 | 0.2 | 0.2 | | | |
| Ammonia | pH adjustor | | 0.1 | | 0.1 | 0.1 | | 0.1 | 0.1 | | 0.1 |
| | Total Weight (lb) | | 100 | 100 | 100 | 100 | 100 | 100 | 100 | 100 | 100 |
| | Application (A: Adhesive; C: Coating; P: Paint) | | P | P | P | C/P | C/P | C/P | A | A | A |
| | Total Solid (%) | | 72.3% | 73.2% | 72.8% | 56.3% | 56.2% | 56.3% | 51.1% | 51.0% | 51.1% |
| | Tensile Strength at -10°C (psi) | | 350 | 280 | 320 | 310 | 240 | 280 | 300 | 230 | 270 |
| | Tensile Strength at +40°C (psi) | | 150 | 120 | 130 | 140 | 110 | 120 | 140 | 110 | 120 |
| | Elongation at -10°C (%) | | 1 | 80 | 35 | 1 | 100 | 58 | 1 | 120 | 55 |
| | Elongation at +40°C (%) | | 70 | 250 | 120 | 100 | 280 | 150 | 110 | 290 | 160 |
| | Moisture Vapor Transmission ASTM E96, Method B | | 7.0 | 4.0 | 5.0 | 7.0 | 4.0 | 5.0 | 7.0 | 4.0 | 5.0 |

*FIGURE 1*

| Examples Group 2 Polyurethane / EPDM | | | a | b | c | d | e | f | g | h | i |
|---|---|---|---|---|---|---|---|---|---|---|---|
| Materials | Function | Source | Pound | Pound | Pound | Pound | Pound | Pound | Pound | Pound | Pound |
| Component A | | | | | | | | | | | |
| EPDM High Solid Latex | EPDM latex | Lion Copolymer, LLC | 3 | 27 | 15 | 5 | 45 | 20 | 10 | 80 | 35 |
| Bayhydrol A 145 | Polyurethane dispersion | Bayer | 27 | 3 | 15 | 45 | 5 | 30 | 80 | 10 | 55 |
| DI Water | | | 19.4 | 17.5 | 18.4 | 22.9 | 23 | 22.9 | 3.9 | 4 | 3.9 |
| Tiona® 595 | TiO2 pigment | Cristal global | 15 | 15 | 15 | 10 | 10 | 10 | 5 | 5 | 5 |
| Talc 150 | Talc Filler | Mineral and Pigment Solutions Inc. | 30 | 30 | 30 | 15 | 15 | 15 | | | |
| Efka® 6230 | Pigment dispersant | BASF | 4 | 6 | 5 | 2 | 2 | 2 | 1 | 1 | 1 |
| Rheolate® 2000 | Thickner | Elementis | 1 | 1 | 1 | | | | | | |
| ByK®-028 | Defoamer | BYK | 0.5 | 0.5 | 0.5 | | | | | | |
| Component B | | | | | | | | | | | |
| Desmodur XP 2410 | polyisocyanates | Bayer | 0.1 | 0.1 | 0.1 | 0.1 | 0.1 | 0.1 | 0.1 | 0.1 | 0.1 |
| | Total Weight (lb) | | 100 | 100 | 100 | 100 | 100 | 100 | 100 | 100 | 100 |
| | Application (A: Adhesive; C: Coating; P: Paint) | | P | P | P | C/P | C/P | C/P | A | A | A |
| | Total Solid (%) | | 65.6% | 67.5% | 66.6% | 52.1% | 52.0% | 52.1% | 51.1% | 51.0% | 51.1% |
| | Tensile Strength at +20°C (psi) | | 1500 | 850 | 1200 | 1400 | 800 | 1000 | 1300 | 750 | 1000 |
| | Elongation at +20°C (%) | | 25 | 240 | 120 | 35 | 260 | 140 | 50 | 290 | 155 |
| | Moisture Vapor Transmission ASTM E96, Method B | | 5.0 | 4.0 | 5.0 | 5.0 | 4.0 | 5.0 | 5.0 | 4.0 | 5.0 |
| | Impact Strength (in.lbs) | | 55.0 | 120.0 | 80.0 | 65.0 | 140.0 | 90.0 | 80.0 | 170.0 | 110.0 |

*FIGURE 2*

| Examples Group 3 | Epoxy / EPDM | | a | b | c | d | e | f | g | h | i |
|---|---|---|---|---|---|---|---|---|---|---|---|
| Materials | Function | Source | Pound | Pound | Pound | Pound | Pound | Pound | Pound | Pound | Pound |
| Component A | | | | | | | | | | | |
| EPDM High Solid Latex | EPDM latex | Lion Copolymer, LLC | 3 | 27 | 15 | 10 | 20 | 40 | 5 | 10 | 15 |
| DOW DER 331 | Polyurethane dispersion | Bayer | 27 | 3 | 15 | 20 | 20 | 20 | 30 | 30 | 30 |
| Heloxy 62 | Diluent | Momentive | 4 | 4 | 4 | | | | | | |
| Component B | | | | | | | | | | | |
| Epilink 701 | curing agent | Air Products | 40 | 20 | 30 | 30 | 30 | 30 | 40 | 40 | 40 |
| Surfynol DF62 | Defoamer | Air Products | 1 | 1 | 1 | 1 | 1 | 1 | | | |
| DI Water | | | 4 | 24 | 14 | 13 | 13 | 2 | | | |
| BYK 190 | Pigment dispersant | BYK | 1 | 1 | 1 | 1 | 1 | 1 | | | |
| Talc 150 | Talc Filler | Mineral and Pigment Solutions Inc. | 10 | 10 | 10 | 20 | 10 | | 25 | 20 | 15 |
| Stan-Tone™ 82EPX01 | Iron pigment | PolyOne | 10 | 10 | 10 | 5 | 5 | 5 | | | |
| | | Total Weight (lb) | 100 | 100 | 100 | 100 | 100 | 99 | 100 | 100 | 100 |
| | | Application (A: Adhesive; C: Coating; P: Paint) | P | P | P | C/P | C/P | C/P | A | A | A |
| | | Total Solid (%) | 81.0% | 61.0% | 71.0% | 72.0% | 67.0% | 68.0% | 82.5% | 80.0% | 77.5% |
| | | Tensile Strength at +20°C (psi) | 1100 | 600 | 900 | 1000 | 900 | 800 | 1500 | 1400 | 1300 |
| | | Elongation at +20°C (%) | 35 | 180 | 110 | 60 | 90 | 120 | 70 | 90 | 140 |
| | | Moisture Vapor Transmission ASTM E96, Method B | 5.0 | 4.0 | 5.0 | 5.0 | 4.0 | 5.0 | 5.0 | 4.0 | 5.0 |
| | | Impact Strength (in.lbs) | 40.0 | 90.0 | 68.0 | 70.0 | 90.0 | 110.0 | 60.0 | 80.0 | 100.0 |

*FIGURE 3*

Examples Alkyd Latex / EPDM Latex

| Materials | Function | Source | a Pound | b Pound | c Pound | d Pound | e Pound | f Pound | g Pound | h Pound | i Pound |
|---|---|---|---|---|---|---|---|---|---|---|---|
| EPDM High Solid Latex | EPDM Latex | Lion Copolymer Geismar, LLC | 3 | 27 | 15 | 5 | 45 | 20 | 10 | 80 | 35 |
| BECKOSOL AQ® 510 | Alkyd latex | ReichHold | 27 | 3 | 15 | 45 | 5 | 30 | 80 | 10 | 55 |
| DI Water | | | 51.4 | 50 | 48.9 | 30.3 | 38.6 | 37.4 | 5 | 5 | 5 |
| Ti Pure R-706 | TiO2 pigment | Dupont | 10 | 15 | 15 | 10 | 10 | 10 | 5 | 5 | 5 |
| 5% CoHydro-Cure II | Curative | OMG | 0.2 | 0.1 | 0.2 | 0.5 | 0.1 | 0.2 | | | |
| 12% ZrHydro-Cem | Calcium carbonate extender | OMG | 0.2 | 0.1 | 0.2 | 0.5 | 0.1 | 0.2 | | | |
| Minex 7 | Pigment dispersant | Unimin | 2 | 2 | 2 | 2 | 1 | 2 | | | |
| Aquaflow NHS 300 | Rheologica modifier | Ashland | 4 | 2 | 2 | 5 | | | | | |
| Byk® -022 | Defoamer | BYK | 0.5 | 0.4 | 0.5 | 0.5 | | | | | |
| AMP 95 | Coalescing agent | Dow Chemical | 1.5 | 0.2 | 1 | 1 | | | | | |
| Bioban™ BP-40 | Biocide | Dow Chemical | 0.2 | 0.2 | 0.2 | 0.2 | 0.2 | 0.2 | | | |
| | | Total Weight (lb) | 100 | 100 | 100 | 100 | 100 | 100 | 100 | 100 | 100 |
| | | Application (A: Adhesive; C: Coating; P: Paint) | P | P | P | C/P | C/P | C/P | A | A | A |
| | | Total Solid (%) | 33.6% | 35.0% | 36.1% | 44.7% | 36.4% | 37.6% | 50.0% | 50.0% | 50.0% |
| | | Tensile Strength at -10°C (psi) | 400 | 330 | 370 | 360 | 290 | 330 | 350 | 280 | 320 |
| | | Tensile Strength at +40°C (psi) | 200 | 170 | 180 | 190 | 160 | 170 | 190 | 160 | 170 |
| | | Elongation at break at -10°C (%) | 1 | 48 | 21 | 1 | 60 | 35 | 1 | 72 | 33 |
| | | Elongation at +40°C (%) | 42 | 150 | 72 | 60 | 168 | 90 | 66 | 174 | 96 |
| | | Moisture Vapor Transmission ASTM E96, Method B | 7.0 | 4.0 | 5.0 | 7.0 | 4.0 | 5.0 | 7.0 | 4.0 | 5.0 |

*FIGURE 4*

CROSS-LINKED ETHYLENE PROPYLENE DIENE TERPOLYMER LATEX BLEND FOR IMPROVED COATINGS

CROSS REFERENCE TO RELATED APPLICATIONS

The present application claims priority to and the benefit of U.S. Provisional Patent Application Ser. No. 61/829,961 filed on May 31, 2013, entitled "METHOD FOR MAKING A HIGH SOLIDS CROSS-LINKED ETHYLENE PROPYLENE DIENE MONOMER LATEX"; U.S. Provisional Patent Application Ser. No. 61/829,971 filed on May 31, 2013, entitled "HIGH SOLIDS CROSS-LINKED ETHYLENE PROPYLENE DIENE MONOMER LATEX"; and U.S. Provisional Patent Application Ser. No. 61/829,975 filed on May 31, 2013, entitled "CROSS-LINKED ETHYLENE PROPYLENE DIENE LATEX BLENDS FOR IMPROVED COATINGS". These references are hereby incorporated in their entirety.

FIELD

The present embodiments generally relate to latex blends of a cross-linked ethylene propylene diene terpolymer latex and non-cross-linked ethylene propylene diene terpolymer latex blended with an acrylic, a urethane suspension, or an epoxy.

BACKGROUND

A need exists for an improved coating with lower brittleness at cold temperatures.

A need exists for an improved coating with improved water barrier properties.

A need exists for an improved coating with higher acid and base resistance.

A need exists for an improved coating with better natural weather resistance without the need for additional additives.

The present embodiments meet these needs.

BRIEF DESCRIPTION OF THE FIGURES

The detailed description will be better understood in conjunction with the accompanying drawings as follows:

FIG. 1 depicts a table for an EPDM latex blended with acrylic.

FIG. 2 depicts a table for an EPDM latex blended with polyurethane.

FIG. 3 depicts a table for an EPDM latex blended with epoxy.

FIG. 4 depicts a table for an EPDM latex blended with a latex containing a waterborne alkyd resin.

The present embodiments are detailed below with reference to the listed Figures.

DETAILED DESCRIPTION OF THE EMBODIMENTS

Before explaining the present formulation in detail, it is to be understood that the formulations are not limited to the particular embodiments and that it can be practiced or carried out in various ways.

The present embodiments relate to blend formulations that include a high solids cross-linked ethylene propylene diene terpolymer latex usable as a waterproofing material for roofs, or usable in paints to improve adhesion or usable in adhesives to provide a better matrix.

The present embodiments relate to blend formulations that include a high solids non-cross-linked ethylene propylene diene terpolymer latex The formulation uses from 15 weight percent to 88 weight percent of a premixed liquid ethylene propylene diene terpolymer (EPDM) component, sometimes referenced herein as the "EPDM cement", "EPDM starting material" or "premixed liquid ethylene propylene diene terpolymer component" or "premixed liquid EPDM component." In embodiments, a dry rubber starting material can be used that is then mixed with a solvent to create the premixed liquid ethylene propylene diene terpolymer component.

This premixed liquid EPDM component can contain 4 weight percent to 50 weight percent of solid ethylene/propylene polymers with molecular weights from 1300000 Mw to 5000 Mw. Molecular weights from 10000 Mw to 600000 Mw are also considered useful herein. Molecular weights that are from 5000 Mw to 80000 Mw are also useful. When used for gel formulations, the molecular weight can be 1000000 Mw.

The polymer consists of random covalently linked monomers of ethylene and propylene covalently connected to diene. The diene can be a methylidene norbornene, dicyclopentadiene, ethylidene norbornene, 1,4-hexadiene, or a vinyl norbornene.

The premixed liquid EPDM component can include 50 weight percent to 96 weight percent of a solvent. The solvent can be hexane, isopar, mineral oil, toluene, or another constant boiling hydrocarbon solvent. The solvent can be a pure solvent, such as pure hexane, or combinations of solvent.

The premixed liquid EPDM component can be blended with 10 weight percent to 70 weight percent of water that can be a member of the group: distilled water, deionized water, tap water, process water, and combinations thereof.

The premixed liquid EPDM component can be blended with 1 weight percent to 15 weight percent of a surfactant. The surfactant can be cationic surfactant, anionic surfactant, non-ionic surfactant, or combinations thereof.

The surfactant can be selected from the group consisting of: a tetra-octyl ammonium chloride, a sulfo-succinate, a carboxylates, polyoxyethylene sorbates, cetyl ammonium chloride, sodium alkyl benzyl sulfonate, sodium lauryl sulfate, potassium lauryl sulfate, ammonium lauryl sulfate, rosin acids, tallow fatty acids, polyethylene stearyl ethers, perfluoro butane sulfonic acid, alkyl naphthalene sulfonate, or combinations thereof.

The EPDM formulation usable in these blends can be formed, in an embodiment, by mixing together these three ingredients for 1 minute and 30 minutes at atmospheric pressure to form an intermediate latex with minimum frothing.

In embodiments, a curative from 0.3 weight percent to 1.76 weight percent can be added to the formed intermediate latex.

The curative can be a peroxide, hydroperoxide, peroxycarbonate, thiuram, thiazole, dithiocarbamate, xanthate, sulfenamide, sulfur, phenolic resins, benzothiazole, and combinations thereof.

After mixing, and after a first and second heating, at least 50 percent to 98 percent cross-linked high solids ethylene propylene diene terpolymer (EPDM) latex can be formed. The created latex, when applied to a substrate and at least 99 percent of the water is removed, can exhibit: a glass transition temperature of −50 degrees Celsius to −40 degrees Celsius; impact resistance as measured by a falling dart test that has less than a 50 percent failure at 20 inch-pound at an ambient temperature; moisture barrier of less than 1.0 perm unit as determined by ASTM D 1735 preventing penetration of water to a substrate; and a color change of delta E of less than 5 as measured by the accelerated weathering tests ASTM G 154 and ASTM D 3632 and further wherein the formed high solids cross-linked ethylene propylene diene terpolymer is miscible with acrylic, urethane, alkyd, and epoxy lattices.

In embodiments, the sulfur can include accelerators or catalysts in the total curative weight percent. Zinc diethyldithiocarbamate can be used as an accelerator. Zinc benzothiozole can be used as a catalyst herein. In embodiments, from 10 weight percent to 90 weight percent of the curative can be the accelerator, the catalyst or combinations of the two.

To the formed latex with curative, a first heat can be applied at temperatures ranging from 60 degrees Celsius to 100 degrees Celsius for 10 minutes to 60 minutes under vacuum to remove 95 weight percent to 99 weight percent of the solvent while simultaneously cross-linking the latex at least 50 percent, forming a partially cross-linked latex. In embodiments, at least 80 percent of the polymer can be cross-linked. 100 percent cross-linking can be achieved in the first heating.

A second heat can be applied to the partially cross-linked latex to remove 1 percent to 95 percent of the water at a temperature ranging from 60 degrees Celsius to 100 degrees Celsius for 10 minutes to 60 minutes under vacuum forming a high solids, high percentage cross-linked ethylene propylene diene terpolymer latex with 30 weight percent to 60 weight percent polymer dispersed in water.

Embodiments of the blends can use this high solids EPDM latex, with a solids content from 30 weight percent to 80 weight percent.

The final high solids cross-linked ethylene propylene diene terpolymer latex can be a volatile organic compound free formulation allowing the blends to be formed without VOC issues.

The high solids cross-linked ethylene propylene diene terpolymer latex produces low, such as less than 50 g/L, emissions on curing, which improves the health of workers applying the coating to a substrate, such as a house or a boat.

The final high solids cross-linked ethylene propylene diene terpolymer latex is easy to handle and apply to a substrate, and has an easy flowability at temperatures ranging from 1 degree Celsius to 50 degrees Celsius.

The blends can be suitable for a wide variety of applications and provide resistance to moisture once dried.

Embodiments of the blends can be white, clear, opaque, or colored with a pigment, such as carbon black.

The term "latex" refers to polymers dispersed in water with or without additional solvent.

The term "EPDM" refers to ethylene propylene diene terpolymers. These EPDM terpolymers have no double bonds in the backbone of the polymer chains and, thus, are less sensitive to oxygen and ozone and have high UV-resistance. In EPDM, the ethylene and propylene comonomers form a saturated polymer backbone with randomly distributed, non-conjugated diene monomers, which provide unsaturations attached to the main chain.

The term "high solids" refers to the total resulting formulation having at least 30 weight percent solids and up to 80 weight percent, as measured by ASTM D 1417-10 for synthetic rubber lattices.

The phrase "percent cross-linked" refers to the density of the cross-links formed in the resulting formulation. A percent cross-linked can be calculated by using the percent solubility of the polymer of the latex in toluene indicating the "relative cross-linking" of the polymer.

The term "water" refers to deionized water, tap water, distilled water, process water or combinations thereof.

The term "surfactant" refers to a detergent or a dispersant. In embodiments, the surfactant doubles as a wetting agent.

The term "cured latex" refers to the cross-linked final EPDM formulation.

The term "minimal frothing" refers to an event upon mixing which adds air bubbles to less than 10 percent of the entire latex by volume. The unique formation of this is believed to have reduced bubble content, or "minimal frothing" when mixing at a high shear rate due the surface tension properties of the latex which is created by the combination of physical network junctions including temporary and trapped entanglements of chains formed with the aid of the surfactant.

The term "high shear" relates to the use of a high shear mixer. High shear is mixing at greater than 1000 revolutions per minute.

The term "polyurethane dispersion" as used herein refers to a product that results from reacting a combination of a polyol with an isocyanate dispersed in water through the action of a surfactant.

The starting material of the cross-linked EPDM can have a dynamic tensile modulus greater than non-cross-linked polymers of ethylene propylene terpolymers (EPM). The higher the cross-linking the more improved the dynamic tensile modulus.

This cross-linked EPDM formulation can have an improved tensile modulus, such as 50 percent to 500 percent increased tensile modulus, as compared to a non-cross-linked EPDM.

The cross-linked EPDM formulation, once dried, can have better solvent resistance than a less cross-linked or non-cross-linked EPDM, by at least 2 percent.

The cross-linked EPDM latex used in the novel blends can include 15 weight percent to 88 weight percent of a premixed liquid EPDM component of random covalently linked monomers of ethylene and propylene having weight ratios from 40:60 to 85:15 of ethylene:propyene respectively; of which, 0.25 weight percent to 15 weight percent of the 15 weight percent to 88 weight percent solid polymer is a diene selected from the group: methylidene norbornene, dicyclopentadiene, ethylidene norbornene, 1,4-hexadiene, vinyl norbornene, and combinations thereof.

Embodiments of the blends can include a defoaming agent that is added prior to mixing to form the intermediate latex or after the mixing to form the intermediate latex.

In embodiments, the defoaming agent can be selected from the group: a poly-dimethyl siloxane, a poly-dimethyl siloxane with finely divided silica, such as DOW CORNING® 1500, or combinations thereof. DOW CORNING® Antifoam 1430 and BYK 021 defoamer available from BYK-Chemie GmbH can also be used herein.

Embodiments of the formulation can include using 1 weight percent to 10 weight percent of an anti-settling stabilizer before removing the water from the blended EPDM. The anti-settling stabilizer can be hydroxyethyl cellulose, glycerin, a hydrophobically modified alkali soluble acrylic emulsion, such as those available from The Dow Chemical Company and known as ACRYSOL® RM-5, polyether urea polyurethane RHEOLATE® 210 from Elementis Specialties. Other usable anti-settling stabilizers include polyester of glycerin and isophthalic acid or linoleic acid, and combinations thereof, Embodiments can include using 0.1 weight percent to 0.2 weight percent of a biocide in the formulation. The weight percent of the biocide is based on the total weight of the formulation.

The biocide can be benzisothiazolinone, 3,5-Dimethyl-2H-1,3,5-thiadiazinane-2-thione biocide, 4,5 dichloro-2-n- octyl-isothazonline-3-one such as those available from Rohm and Haas Company as ROZONE® 2000, or combinations thereof.

A usable biocide can be benzisothiazolinone, such as BIO-BIT® 20 available from The Dow Chemical Company. The biocide can be antimicrobial, providing antibacterial and antifungal protection. Another usable biocide can be a PROTECTOL® available from BASF.

Embodiments of the formulation can include using 5 weight percent to 30 weight percent of a filler selected from the group: a silica, a talc, a starch, carbon black, or combinations thereof.

Embodiments of the formulation can include 0.1 weight percent to 20 weight percent of a pigment, wherein the pigment is selected from the group: an organic dye, a carbon black, a metal oxide, and combinations thereof.

Embodiments of the formulation can include using a surfactant selected from the group: cationic surfactants, anionic surfactants, non-ionic surfactants or combinations thereof.

The formed high solids ethylene propylene diene terpolymer (EPDM) latex can have at least 50 percent to 98 percent relative cross-linking wherein the formed high solids cross-linked ethylene propylene diene terpolymer (EPDM) gel when applied to a substrate and at least 99 percent of the water is removed exhibits a glass transition temperature of −50 degrees Celsius to −40 degrees Celsius; impact resistance as measured by a falling dart test that has less than a 50 percent ductile failure at 20 inch-pounds at ambient temperatures; moisture barrier of less than 1.0 perm unit as determined by ASTM D 1735 preventing penetration of water to a substrate; and a color change of delta E of less than 5 as measured by accelerated weathering tests, ASTM G 154 and ASTM D 3632.

Example 1

To Prepare the EPDM Latex Component

A hexane solution containing 8 weight percent solid ROYALENE® 525 polymer was the premixed liquid EPDM component. ROYALENE® 525 has a 60:40 ethylene:propylene ratio and 8.09 weight percent ethylidene norbomene (ENB).

In this embodiment, 30 grams of the premixed liquid EPDM component was mixed with 60 grams of deionized water and 10.7 grams of a surfactant known as OT-75% which is a sulfosuccinate with 75 percent solids available from Cytec Industries, Inc.

The mixing occurred at 20,000 rpm for 1 minute using a Wiggen Hauser D-500 Shear Power Homogenizer at atmospheric pressure.

This high shear mixing was followed by repeated passes on a GEA Niro Soavi High Pressure Homogenizer known as the PANDA® 2K set at 500 bar until a uniform mixture was formed.

The uniform mixture was then charged with 2 drops of DOW CORNING® Antifoam 1500 using a plastic disposable dropper into an azeotropic distillation apparatus equipped with a Dean-Stark apparatus to condense and trap the evaporated hexane and water, Next, heating was employed to remove most of the hexane. The heating was performed at 62 degrees Celsius, Then 0.5 grams of peroxide curative VUL-CUP® available from Arkema, Inc. was added to form a partially cross-linked latex in the same azeotropic distillation apparatus. The mixture was refluxed under partial vacuum at 60 degrees Celsius until 50 weight percent solids latex was obtained with a 70 percent relative cross-linking.

Expected physical properties and characteristics for the final latex of Example 1:

|  | Typical Values | Test Method |
|---|---|---|
| FINAL FORMULATION | | |
| Color | White | Visual |
| Specific Gravity | 1.02 | ASTM D 1475 |
| Brookfield Viscosity | 32 cps | ASTM D 2196 |
| VOC Content | <50 g/L | ASTM D 2369 |
| Solids Content | 50% | ASTM C 681 |
| Flash Point (open cup) | In excess of 90 degrees Centigrade | ASTM D 56 |
| Application Properties | | |
| Service Temperature | −50° C. to 100° C. | ASTM D 3359 |
| Application Temp | 1° C. to 50° C. | ASTM C 603 |

FIG. 1 depicts a table for an EPDM latex blended with acrylic.

The blends of the embodiments include creating a first blend of 20 weight percent to 90 weight percent of a high solids 50 percent to 98 percent cross-linked ethylene propylene diene terpolymer latex that is blended with 10 weight percent to 80 weight percent of aqueous acrylic ester copolymer such as ACRONAL OPTIVE® 320 available from BASF or hydrofunctional polyacrylic dispersion known as BAYHYDROL® A 145™ from Bayer.

FIG. 2 depicts a table for an EPDM latex blended with polyurethane.

Blends of the embodiments include creating a second blend of 20 weight percent to 90 weight percent of a high solids 50 percent to 98 percent cross-linked ethylene propylene diene terpolymer latex that is blended with 10 weight percent to 80 weight percent of a polyurethane dispersion.

FIG. 3 depicts a table for an EPDM latex blended with epoxy.

Blends of the embodiments include creating a third blend of 20 weight percent to 90 weight percent of a high solids 50 percent to 98 percent cross-linked ethylene propylene diene terpolymer latex that is blended with 10 weight percent to 80 weight percent of a bisphenol-A-diglycidyl ether epoxy resin such as those available from DER® 321 from The Dow Chemical Company.

Embodiments of the ethylene propylene diene terpolymer latex blend can include 0.1 weight percent to 2 weight percent of a coalescing agent. The coalescing agent is a dimethyl adipate.

Embodiments of the ethylene propylene diene terpolymer latex blend include using 0.1 weight percent to 0.5 weight percent a pH adjuster to maintain the blend to be within 7 pH to 8 pH. In embodiments, the pH adjuster is ammonia.

In the examples shown in the Figures, the EPDM latex is blended at ambient temperatures in the amounts shown with the additional ingredients.

FIG. 4 depicts a table for an EPDM latex blended with a latex containing a waterborne alkyd resin.

Waterborne alkyd resins usable herein include alkyd resins that are water-dissipatible, water-dispersible, or water-reducible (i.e. the alkyd resins are able to get into water). It should be noted that the waterborne alkyd does not contain a pendant sulfonate group to impart water-dissipatibility, water-dispersibility, or water-reducibility.

Waterborne alkyds useful in the invention are, for example, those having other groups to impart water-dissipatibility, water-dispersibility, or water-reducibility.

Such groups to impart water-dissipatibility and water dispersibility or water reducibility include, but are not limited to, pendant carboxylic acid groups as well as salts or anhydrides thereof, pendant polyethylene glycol groups and other pendant hydrophilic groups.

The waterborne alkyd may also be dissipated, dispersed, or reduced into water using cosurfactants as known in the art. Examples of usable alkyd resins are well known in the industry.

Generally waterborne alkyd resins may be prepared by reacting a monobasic fatty acid, fatty ester or naturally occurring-partially saponified oil; a glycol or polyol; and a polycarboxylic acid.

The monobasic fatty acid, fatty ester, or naturally occurring-partially saponified oil is preferably selected from the formulae (I), (II), and (III):

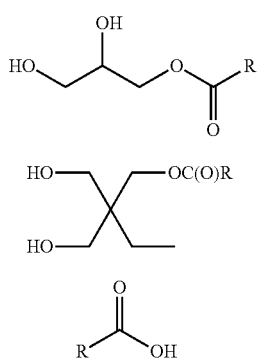

In embodiments, the ethylene propylene diene terpolymer latex blend that has 20 weight percent to 90 weight percent of a high solids 50 percent to 98 percent cross-linked ethylene propylene diene terpolymer latex as describe above and is blended with 10 weight percent to 90 weight percent of an alkyd latex dispersion.

In embodiments, the cross-linked ethylene propylene diene terpolymer latex blend with alkyd latex dispersion further includes 0.1 weight percent to 30 weight percent of a pigment, wherein the pigment is selected from the group: an organic dye, carbon black, metal oxides and combinations thereof.

In embodiments, the cross-linked ethylene propylene diene terpolymer latex blend with alkyd latex dispersion further includes 0.1 weight percent to 2 weight percent of a coalescing agent as described herein.

In embodiments, the cross-linked ethylene propylene diene terpolymer latex blend with alkyd latex dispersion further includes 0.1 weight percent to 0.5 weight percent a pH adjuster to maintain the blend to be within 7 pH to 8 pH. The pH adjuster can be one of the already described pH adjusters.

In embodiments, the cross-linked ethylene propylene diene terpolymer latex blend with alkyd latex dispersion further includes a defoaming agent as described herein.

While these embodiments have been described with emphasis on the embodiments, it should be understood that within the scope of the appended claims, the embodiments might be practiced other than as specifically described herein.

What is claimed is:

1. An ethylene propylene diene terpolymer latex blend comprising:

a. 20 weight percent to 90 weight percent of a high solids 50 percent to 98 percent cross-linked ethylene propylene diene terpolymer latex comprising:
      (i) 15 weight percent to 88 weight percent ethylene propylene diene terpolymer with a molecular weight from 1300000 Mw to 5000 Mw, wherein the ethylene propylene diene terpolymer is formed from a plurality of random covalently linked monomers of ethylene and propylene having weight ratios from 40:60 to 85:15 of ethylene:propylene respectively; and 0.25 weight percent to 15 weight percent of the polymer is diene, wherein the diene is selected from the group: methylidene norbornene, dicyclopentadiene, ethylidene norbornene, 1,5, hexadiene, vinyl norbornene;
      (ii) 10 weight percent to 70 weight percent of a water, wherein the water is selected from the group consisting of: distilled water, deionized water, tap water, process water and combinations thereof; and
      (iii) 1 weight percent to 15 weight percent of a surfactant to form a latex, wherein the surfactant is selected from the group consisting of: a tetra-octyl ammonium chloride, a sulfo-succinate, a carboxylates, polyoxyethylene sorbates, cetyl ammonium chloride, sodium alkyl benzyl sulfonate, sodium lauryl sulfate, potassium lauryl sulfate, ammonium lauryl sulfate, rosin acids, tallow fatty acids, polyethylene stearyl ethers, perfluoro butane sulfonic acid, alkyl naphthalene sulfonate, or combinations thereof; and
   b. 10 weight percent to 80 weight percent of aqueous acrylic ester copolymer or a hydrofunctional polyacrylic dispersion.

2. The ethylene propylene diene terpolymer latex blend of claim 1, further comprising 1.0 weight percent to 10 weight percent of an anti-settling stabilizer selected from the group consisting of: hydroxyethyl cellulose, glycerin, a hydrophobically modified alkali soluble acrylic emulsion, polyether urea polyurethane, polyester of glycerin and isophthalic acid or linoleic acid, and combinations thereof.

3. The ethylene propylene diene terpolymer latex blend of claim 1, further comprising 0.1 weight percent to 0.2 weight percent of a biocide selected from the group consisting of: benzisothiazolinone, 3,5-Dimethyl-2H-1,3,5-thiadiazinane-2-thione biocide, 4,5 dichloro-2-n-octyl-isothazonline-3-one or combinations thereof.

4. The ethylene propylene diene terpolymer latex blend of claim 1, further comprising 5.0 weight percent to 30 weight percent of a filler selected from the group consisting of: a silica, a talc, a starch, carbon black, or combinations thereof.

5. The ethylene propylene diene terpolymer latex blend of claim 1, further comprising 0.1 weight percent to 30 weight percent of a pigment, wherein the pigment is selected from the group: an organic dye, carbon black, metal oxides and combinations thereof.

6. The ethylene propylene diene terpolymer latex blend of claim 1, further comprising 0.1 weight percent to 2 weight percent of a coalescing agent.

7. The ethylene propylene diene terpolymer latex blend of claim 6, wherein the coalescing agent is a dimethyl adipate.

8. The ethylene propylene diene terpolymer latex blend of claim 1, further comprising 0.1 weight percent to 0.5 weight percent a pH adjuster to maintain the blend to be within 7 pH to 8 pH.

9. The ethylene propylene diene terpolymer latex blend of claim of claim 8, wherein the pH adjuster is ammonia.

10. The ethylene propylene diene terpolymer latex blend of claim 1, further comprising a defoaming agent.

11. An ethylene propylene diene terpolymer latex blend comprising:
   a. 20 weight percent to 90 weight percent of a high solids 50 percent to 98 percent cross-linked ethylene propylene diene terpolymer latex comprising:
      (i) 15 weight percent to 88 weight percent ethylene propylene diene terpolymer with a molecular weight from 1300000 Mw to 5000 Mw, wherein the ethylene propylene diene terpolymer is formed from a plurality of random covalently linked monomers of ethylene and propylene having weight ratios from 40:60 to 85:15 of ethylene:propylene respectively; and 0.25 weight percent to 15 weight percent of the polymer is diene, wherein the diene is selected from the group: methylidene norbornene, dicyclopentadiene, ethylidene norbornene, 1,5, hexadiene, vinyl norbornene;
      (ii) 10 weight percent to 70 weight percent of a water, wherein the water is selected from the group consisting of: distilled water, deionized water, tap water, process water and combinations thereof; and
      (iii) 1 weight percent to 15 weight percent of a surfactant to form a latex, wherein the surfactant is selected from the group consisting of: a tetra-octyl ammonium chloride, a sulfo-succinate, a carboxylates, polyoxyethylene sorbates, cetyl ammonium chloride, sodium alkyl benzyl sulfonate, sodium lauryl sulfate, potassium lauryl sulfate, ammonium lauryl sulfate, rosin acids, tallow fatty acids, polyethylene stearyl ethers, perfluoro butane sulfonic acid, alkyl naphthalene sulfonate, or combinations thereof; and
   b. 10 weight percent to 90 weight percent of a polyurethane dispersion.

12. The ethylene propylene diene terpolymer latex blend of claim 11, further comprising 0.1 weight percent to 30 weight percent of a pigment, wherein the pigment is selected from the group: an organic dye, carbon black, metal oxides and combinations thereof.

13. The ethylene propylene diene terpolymer latex blend of claim 11, further comprising 0.1 weight percent to 2 weight percent of a coalescing agent.

14. The ethylene propylene diene terpolymer latex blend of claim 11, further comprising 0.1 weight percent to 0.5 weight percent a pH adjuster to maintain the blend to be within 7 pH to 8 pH.

15. The ethylene propylene diene terpolymer latex blend of claim 11, further comprising a defoaming agent.

16. An ethylene propylene diene terpolymer latex blend comprising:
   a. 20 weight percent to 90 weight percent of a high solids 50 percent to 98 percent cross-linked ethylene propylene diene terpolymer latex comprising:
      (i) 15 weight percent to 88 weight percent ethylene propylene diene terpolymer with a molecular weight from 1300000 Mw to 5000 Mw, wherein the ethylene propylene diene terpolymer is formed from a plurality of random covalently linked monomers of ethylene and propylene having weight ratios from 40:60 to 85:15 of ethylene:propylene respectively; and 0.25 weight percent to 15 weight percent of the polymer is diene, wherein the diene is selected from the group: methylidene norbornene, dicyclopentadiene, ethylidene norbornene, 1,5, hexadiene, vinyl norbornene;
      (ii) 10 weight percent to 70 weight percent of a water, wherein the water is selected from the group consisting of: distilled water, deionized water, tap water, process water and combinations thereof; and
      (iii) 1 weight percent to 15 weight percent of a surfactant to form a latex and the surfactant is selected from the group consisting of: a tetra-octyl ammonium chloride, a sulfo-succinate, a carboxylates, polyoxyethylene sorbates, cetyl ammonium chloride, sodium alkyl benzyl sulfonate, sodium lauryl sulfate, potassium lauryl sulfate, ammonium lauryl sulfate, rosin acids, tallow fatty acids, polyethylene stearyl ethers, perfluoro butane sulfonic acid, alkyl naphthalene sulfonate, or combinations thereof; and
   b. 10 weight percent to 90 weight percent of a bisphenol-A-diglycidyl ether epoxy resin.

17. The ethylene propylene diene terpolymer latex blend of claim 16, further comprising 0.1 weight percent to 30 weight percent of a pigment, wherein the pigment is selected from the group: an organic dye, carbon black, metal oxides and combinations thereof.

18. The ethylene propylene diene terpolymer latex blend of claim 16, further comprising 0.1 weight percent to 2 weight percent of a coalescing agent.

19. The ethylene propylene diene terpolymer latex blend of claim 16, further comprising 0.1 weight percent to 0.5 weight percent a pH adjuster to maintain the blend to be within 7 pH to 8 pH.

20. The ethylene propylene diene terpolymer latex blend of claim 16, further comprising a defoaming agent.

21. An ethylene propylene diene terpolymer latex blend comprising:
   a. 20 weight percent to 90 weight percent of a high solids 50 percent to 98 percent cross-linked ethylene propylene diene terpolymer latex comprising:
      (i) 15 weight percent to 88 weight percent ethylene propylene diene terpolymer with a molecular weight from 1300000 Mw to 5000 Mw, wherein the ethylene propylene diene terpolymer is formed from a plurality of random covalently linked monomers of ethylene and propylene having weight ratios from 40:60 to 85:15 of ethylene:propylene respectively; and 0.25 weight percent to 15 weight percent of the polymer is diene, wherein the diene is selected from the group: methylidene norbornene, dicyclopentadiene, ethylidene norbornene, 1,5, hexadiene, vinyl norbornene;
      (ii) 10 weight percent to 70 weight percent of a water, wherein the water is selected from the group consisting of: distilled water, deionized water, tap water, process water and combinations thereof; and
      (iii) 1 weight percent to 15 weight percent of a surfactant to form a latex and the surfactant is selected from the group consisting of: a tetra-octyl ammonium chloride, a sulfo-succinate, a carboxylates, polyoxyethylene sorbates, cetyl ammonium chloride, sodium alkyl benzyl sulfonate, sodium lauryl sulfate, potassium lauryl sulfate, ammonium lauryl sulfate, rosin acids, tallow fatty acids, polyethylene stearyl ethers, perfluoro butane sulfonic acid, alkyl naphthalene sulfonate, or combinations thereof; and
   b. 10 weight percent to 90 weight percent of an alkyd latex dispersion.

22. The ethylene propylene diene terpolymer latex blend of claim 21, further comprising 0.1 weight percent to 30 weight percent of a pigment, wherein the pigment is selected from the group: an organic dye, carbon black, metal oxides and combinations thereof.

23. The ethylene propylene diene terpolymer latex blend of claim 21, further comprising 0.1 weight percent to 2 weight percent of a coalescing agent.

24. The ethylene propylene diene terpolymer latex blend of claim 21, further comprising 0.1 weight percent to 0.5 weight percent a pH adjuster to maintain the blend to be within 7 pH to 8 pH.

25. The ethylene propylene diene terpolymer latex blend of claim 21, further comprising a defoaming agent.

\* \* \* \* \*